(12) United States Patent
Guo

(10) Patent No.: US 8,458,734 B2
(45) Date of Patent: Jun. 4, 2013

(54) PORTABLE ELECTRONIC DEVICE WITH ROTATABLE DISC DRIVE

(75) Inventor: Xin Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 66 days.

(21) Appl. No.: 13/204,731

(22) Filed: Aug. 8, 2011

(65) Prior Publication Data

US 2012/0147729 A1  Jun. 14, 2012

(30) Foreign Application Priority Data

Dec. 13, 2010  (CN) .......................... 2010 1 0584955

(51) Int. Cl.
*G11B 17/04* (2006.01)
*G11B 33/02* (2006.01)

(52) U.S. Cl.
USPC .......................................... 720/646; 720/690

(58) Field of Classification Search
USPC .................. 720/605, 646, 647, 662, 690
See application file for complete search history.

(56) References Cited

U.S. PATENT DOCUMENTS

| 5,631,894 | A * | 5/1997 | Takahashi | 720/667 |
|---|---|---|---|---|
| 5,748,605 | A * | 5/1998 | Lee | 369/222 |
| 5,781,523 | A * | 7/1998 | Ozawa et al. | 720/605 |
| 6,169,720 | B1 * | 1/2001 | Kamemura et al. | 720/605 |
| 7,093,269 | B2 * | 8/2006 | Murotani | 720/605 |
| 7,194,747 | B2 * | 3/2007 | Nakade et al. | 720/662 |
| 7,339,858 | B2 * | 3/2008 | Tatekawa | 369/30.85 |
| 7,418,723 | B2 * | 8/2008 | Nishida et al. | 720/662 |
| 7,418,724 | B2 * | 8/2008 | Tatekawa et al. | 720/673 |
| 8,020,178 | B2 * | 9/2011 | Hasegawa et al. | 720/662 |
| 2001/0012260 | A1 * | 8/2001 | Tamiya et al. | 369/192 |
| 2005/0240953 | A1 * | 10/2005 | Awano | 720/670 |
| 2007/0288947 | A1 * | 12/2007 | Livshits | 720/662 |

\* cited by examiner

*Primary Examiner* — Brian Miller
(74) *Attorney, Agent, or Firm* — Altis Law Group, Inc.

(57) ABSTRACT

A portable electronic device includes a first main body and a disc drive. The disc drive is received in the first main body. The disc drive includes a second main body, a driving element, and a laser assembly. The second main body is rotatably received in the first main body. The driving element is arranged on the second main body for driving a disc. The laser assembly includes a laser slidably received in the first main body. The disc drive is in a use state when the second main body is rotated to cause the driving element to face the laser.

9 Claims, 4 Drawing Sheets

PORTABLE ELECTRONIC DEVICE WITH ROTATABLE DISC DRIVE

BACKGROUND

1. Technical Field

The present disclosure relates to portable electronic devices and, particularly, to a portable electronic device with a disc drive.

2. Description of Related Art

Tablet personal computers are popular for their thinness and portability. Disc drives are important peripheral devices for the tablets. However, the volume and weight of the tablets may increase when a disc drive is added. Therefore, there is a need to provide a tablet personal computer to overcome this problem.

BRIEF DESCRIPTION OF THE DRAWINGS

The components of the drawings are not necessarily drawn to scale, the emphasis instead being placed upon clearly illustrating the principles of a portable electronic device with a disc drive. Moreover, in the drawings, like reference numerals designate corresponding parts throughout several views.

DETAILED DESCRIPTION

Figure 1:
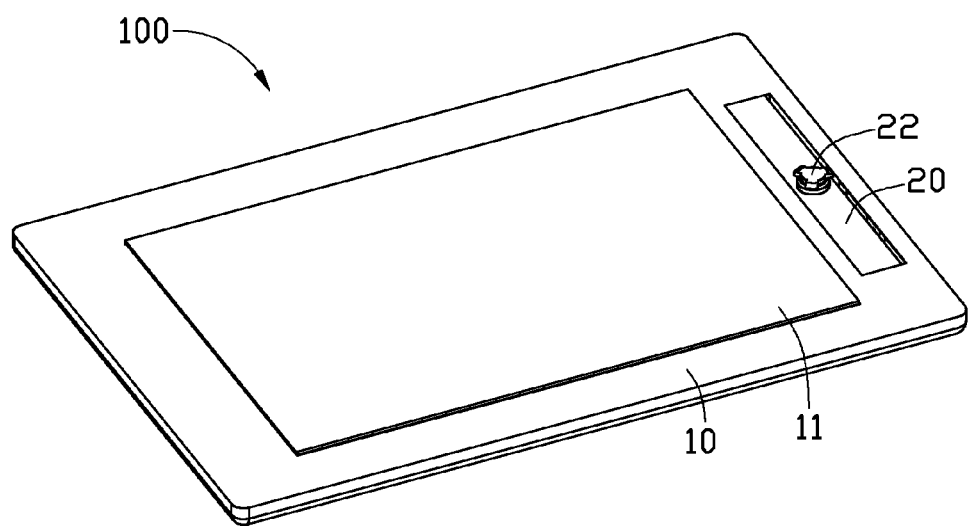
FIG. 1 is an isometric view of a portable electronic device with a disc drive, in accordance with an exemplary embodiment, showing the disc drive in a first state.

Referring to FIG. 1, a portable electronic device 100 includes a main body 10 and a disc drive 20 received in the main body 10. In this embodiment, the device 100 is a tablet personal computer.

Figure 2:
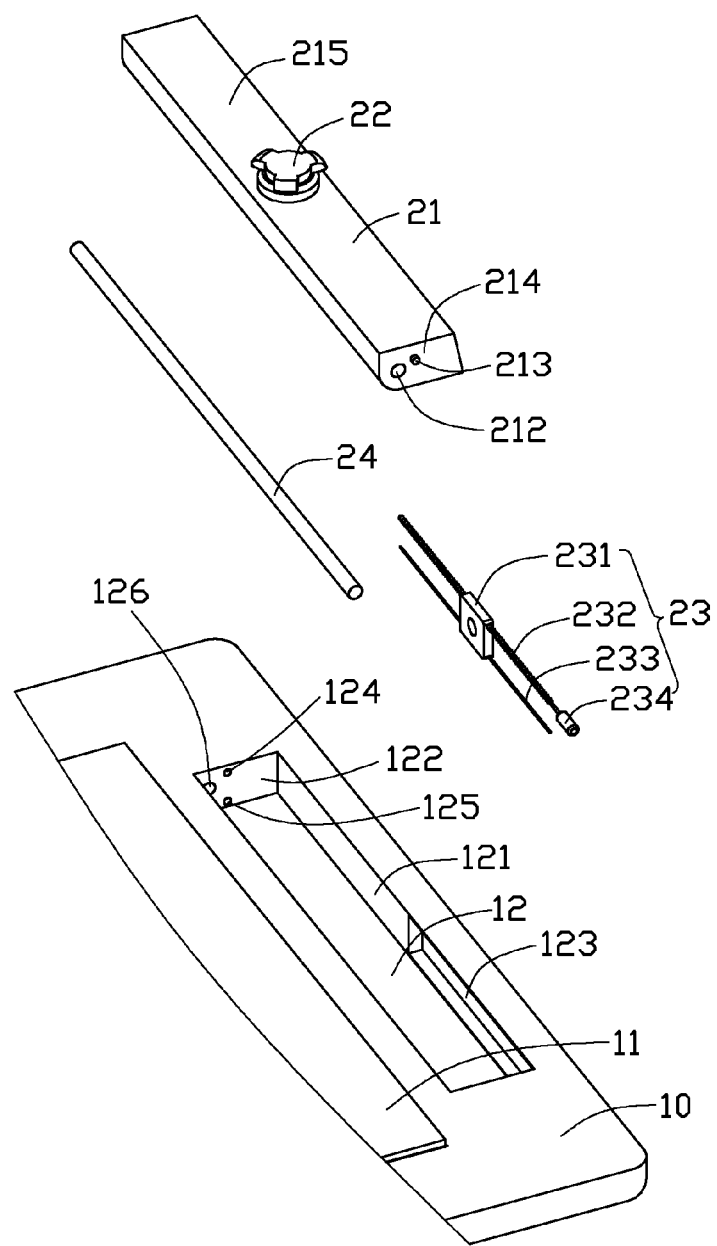
FIG. 2 is a partial, exploded, perspective view of the portable electronic device of FIG. 1.

Referring to FIG. 2, a display screen 11 is arranged in the main body 10. The main body 10 defines a receiving space 12 adjacent to the display screen 11. The receiving space 12 is substantially rectangular. The receiving space 12 borders a sidewall 121 and opposite sidewalls 122 connected to the sidewall 121. A recess 123 is defined in the sidewall 121. Each sidewall 122 defines positioning holes 124, 125. In this embodiment, the positioning hole 124 is above the positioning hole 125. In this embodiment, each sidewall 122 further defines a shaft hole 126. The shaft hole 126 is farther away from the sidewall 121 than the positioning hole 125.

Figure 3:
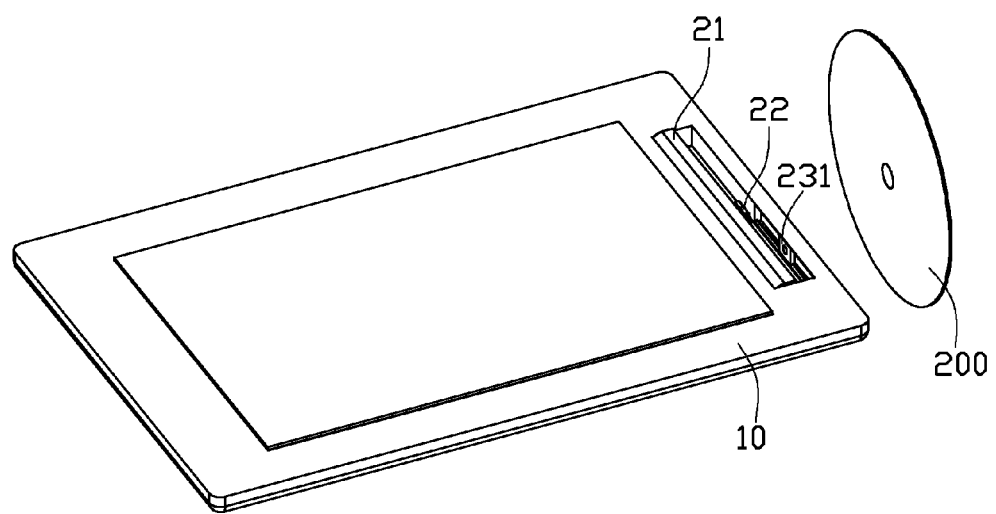
FIG. 3 is another isometric view of the portable electronic device of FIG. 1, showing the disc drive in a second state.

The disc drive 20 includes a main body 21, a driving element 22, a laser assembly 23, and a shaft 24. The main body 21 is substantially rectangular. Referring to FIG. 3, the main body 21 is rotatably received in the receiving space 12 via the shaft 24. The driving element 22 is arranged on the main body 21. The laser assembly 23 is received in the recess 123.

In this embodiment, the length and width of the main body 21 are less than the length and width of the receiving space 12. The main body 21 defines a through hole 212 along a longitudinal side of the main body 21 and with two openings defined in two opposite sidewalls 214 of the main body 21. The shaft 24 passes through the through hole 212 with two ends respectively received in the shaft holes 126 to cause the main body 21 to be rotatably received in the receiving space 12. Two elastic protrusions 213 respectively protrude from the sidewalls 214. The elastic protrusion 213 can be received in the positioning holes 124, 125. The driving element 22 is arranged on a sidewall 215 of the main body 21. The driving element 22 drives a disc 200 mounted on the driving element 22. When the main body 21 is rotated to cause the sidewall 215 to face an opening (not labeled) of the receiving space 12, that is, the main body 21 is rotated to cause the driving element 22 to face the opening of the receiving space 12 (as shown in FIG. 1), the elastic protrusions 213 are respectively received in the positioning holes 124 to fix the main body 21 in position. At this point, the disc drive 20 is in an idle state. When the main body 21 is rotated to cause the sidewall 215 to face the sidewall 121, that is, the main body 21 is rotated to cause the driving element 22 to face the laser assembly 23 (as shown in FIG. 3), the elastic protrusions 213 are respectively received in the positioning holes 125 to fix the main body 21 in position. At this point, the disc drive 20 is in a use state. That is, the laser assembly 23 can read data from the disc 200.

The laser assembly 23 includes a laser 231, a laser shaft 232, a fixing rod 233, and a laser motor 234. The laser shaft 232 passes through the laser 231 with one end rotatably connected to the main body 10 and another end connected to the laser motor 234. In this embodiment, the laser shaft 232 is externally threaded. The fixing rod 233 passes through the laser 232 with two ends received in the main body 10. The laser motor 234 drives the laser shaft 232 to rotate. The rotation of the laser shaft 232 drives the laser 231 to slide in the recess 123, thus the laser 231 can read data from the disc 30 when the disc drive 20 is in the use state.

Figure 4:
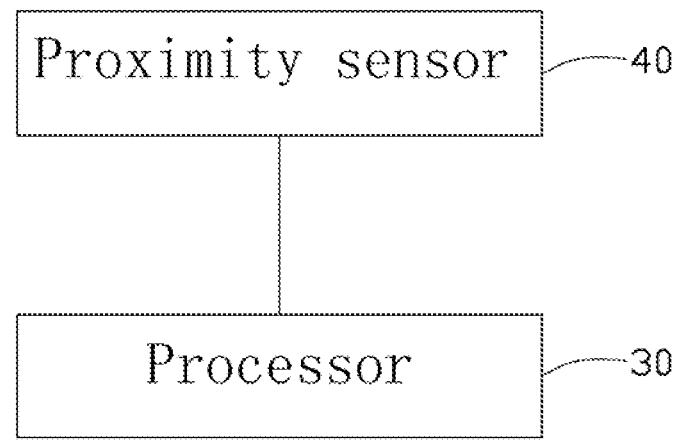
FIG. 4 is a block diagram of the portable electronic device of FIG. 1.

Referring to FIG. 4, the device 100 includes a processor 30 and a proximity sensor 40. The proximity sensor 40 detects whether an object is proximate to the disc 200 while the disc drive 20 is operating. The processor 30 directs the disc drive 20 to stop operating to protect the disc drive 20 when the proximity sensor 30 detects that an object is proximate to the disc 200. For example, when a finger of a user is within the detecting range of the proximity sensor 40, the processor 30 directs the disc drive 20 which is operating to stop operating to prevent the finger from damaging the disc drive 20.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A portable electronic device comprising:
   a first main body; and
   a disc drive received in the first main body, the disc drive comprising a second main body, a driving element, a shaft, and a laser assembly, the shaft passing through the second main body with two opposite ends respectively rotatably received in the first main body, the driving element being arranged on the second main body for driving a disc, the laser assembly comprising a laser slidably received in the first main body, the disc drive being in a use state when the second main body is rotated to cause the driving element to face the laser.

2. The portable electronic device as described in claim 1, wherein the laser assembly further comprises a laser motor and a laser shaft, the laser shaft passes through the laser with one end rotatably connected to the first main body and an opposite end connected to the laser motor, the laser motor drives the laser shaft to rotate, the rotation of the laser shaft drives the laser to slide relative to the first main body.

3. The portable electronic device as described in claim 2, wherein the laser shaft is externally threaded.

4. The portable electronic device as described in claim 3, wherein the laser assembly further comprises a fixing rod, the fixing rod passes through the laser with two opposite ends received in the first main body.

5. The portable electronic device as described in claim 1, wherein the first main body defines a receiving space bordering a first sidewall, a recess is defined in the first sidewall, the second main body is received in the receiving space, the laser assembly is received in the recess.

6. The portable electronic device as described in claim 5, wherein the second main body comprises two opposite sidewalls, two elastic protrusions respectively protrude from the two opposite sidewalls of the second main body, the receiving space borders two opposite second sidewalls connected to the first sidewall, each of the second sidewalls defines a first positioning hole, the driving element faces the laser assembly when the second main body is rotated to cause the elastic protrusions to be respectively received in the first positioning holes.

7. The portable electronic device as described in claim 6, wherein each of the second sidewalls further defines a second fixing hole, the driving element faces an opening of the receiving space when the second main body is rotated to cause the elastic protrusions to be respectively received in the second positioning holes.

8. The portable electronic device as described in claim 1, further comprising a processor and a proximity sensor, wherein the proximity sensor is to detect whether an object is proximate to the disc while the disc drive is operating, the processor is to direct the proximity sensor to stop operating when the proximity sensor detects that an object is proximate to the disc.

9. The portable electronic device as described in claim 1, wherein the portable electronic device is a tablet personal computer.

\* \* \* \* \*